United States Patent
Warren et al.

(10) Patent No.: US 11,557,940 B2
(45) Date of Patent: Jan. 17, 2023

(54) OILFIELD EQUIPMENT CONFIGURABLE TO RECEIVE POWER MODULES TO UTILIZE PRIMARY AND SECONDARY ENERGY SOURCES

(71) Applicant: Halliburton Energy Services, Inc., Houston, TX (US)

(72) Inventors: Wesley John Warren, Marlow, OK (US); Chad A. Fisher, Cache, OK (US); Austin Carl Schaffner, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/170,471

(22) Filed: Feb. 8, 2021

(65) Prior Publication Data

US 2022/0255402 A1  Aug. 11, 2022

(51) Int. Cl.
| | |
|---|---|
| *H02K 7/18* | (2006.01) |
| *H02J 4/00* | (2006.01) |
| *E21B 43/26* | (2006.01) |

(52) U.S. Cl.
CPC .............. *H02K 7/1823* (2013.01); *H02J 4/00* (2013.01); *E21B 43/2607* (2020.05)

(58) Field of Classification Search
CPC ....... H02K 7/1823; H02J 4/00; E21B 43/2607
USPC .......................................................... 290/4 R
See application file for complete search history.

(56) References Cited

U.S. PATENT DOCUMENTS

| | | | |
|---|---|---|---|
| 8,299,645 B2 * | 10/2012 | Muchow | F03D 13/10 290/55 |
| 9,366,114 B2 | 6/2016 | Coli et al. | |
| 10,246,984 B2 | 4/2019 | Payne et al. | |
| 10,519,730 B2 | 12/2019 | Morris et al. | |
| 2011/0215641 A1 * | 9/2011 | Peterson | H02J 7/34 307/23 |
| 2020/0332784 A1 * | 10/2020 | Zhang | F04B 17/06 |
| 2022/0003128 A1 * | 1/2022 | Osama | F02C 7/16 |

* cited by examiner

*Primary Examiner* — Charles Reid, Jr.
(74) *Attorney, Agent, or Firm* — Conley Rose, P.C.; Rodney B. Carroll (57) ABSTRACT

A transportable system has a power distribution system with a power distribution unit and a power module. The power module is configured to provide energy in the form of rotational motion to the power distribution system. The power distribution unit has one or more power converters and an input connection. The power distribution unit is coupled to the power module, and the rotational energy from the power module is transferred to the one or more power converters via the input connection.

23 Claims, 6 Drawing Sheets

OILFIELD EQUIPMENT CONFIGURABLE TO RECEIVE POWER MODULES TO UTILIZE PRIMARY AND SECONDARY ENERGY SOURCES

TECHNICAL FIELD OF THE INVENTION

The present disclosure relates generally to well operations and, more particularly, to systems and methods for utilizing interchangeable energy sources for service equipment.

BACKGROUND

Equipment used in oilfield well services were powered by primary energy sources as the prime mover. Changes have attempted to utilize a secondary energy source generated remotely from the service equipment. Usage of either primary or secondary energy sources has created service equipment specific to each of those energy source types. Specific service equipment utilizing one of the designated energy source types increases total cost and lowers overall unit optimization.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments described below with respect to one implementation are not intended to be limiting.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

For purposes of this disclosure, a control system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a control system may be a personal computer, a network storage device, or any other suitable device and may vary in size, shape, performance, functionality, and price. The control system may include random access memory (RAM), one or more processing resources such as a central processing unit (CPU) or hardware or software control logic, ROM, and/or other types of nonvolatile memory. Additional components of the control system may include one or more disk drives, one or more network ports for communication with external devices as well as various input and output (I/O) devices, such as a keyboard, a mouse, and a video display. The control system may also include one or more buses operable to transmit communications between the various hardware components. The control system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Typically, equipment used in well services were individually powered by primary energy sources (for example, gasoline, diesel, natural gas) as the prime mover. This equipment typically used a combustion engine integrated with the unit to transform fossil fuels into rotational motion to drive single components or multiple components through power distribution system to do the work required to complete the desired service. Recent changes to well service equipment have attempted to utilize a secondary energy source (for example, electricity) generated remotely from the service unit doing the work and sometimes remote to the actual location of the service equipment. These units typically have an electric prime mover directly driving individual components for the most efficient use of the secondary energy. Usage of a primary energy source or a secondary energy source has created service equipment specific to each source type. Service equipment specific to the energy source type increases total capital cost and lowers overall unit utilization.

In certain critical functions, a unit may have to be configured with modules of differing energy sources driving different components such that critical components of the service unit may continue to function in the case of a loss of one of the energy sources.

Figure 1:
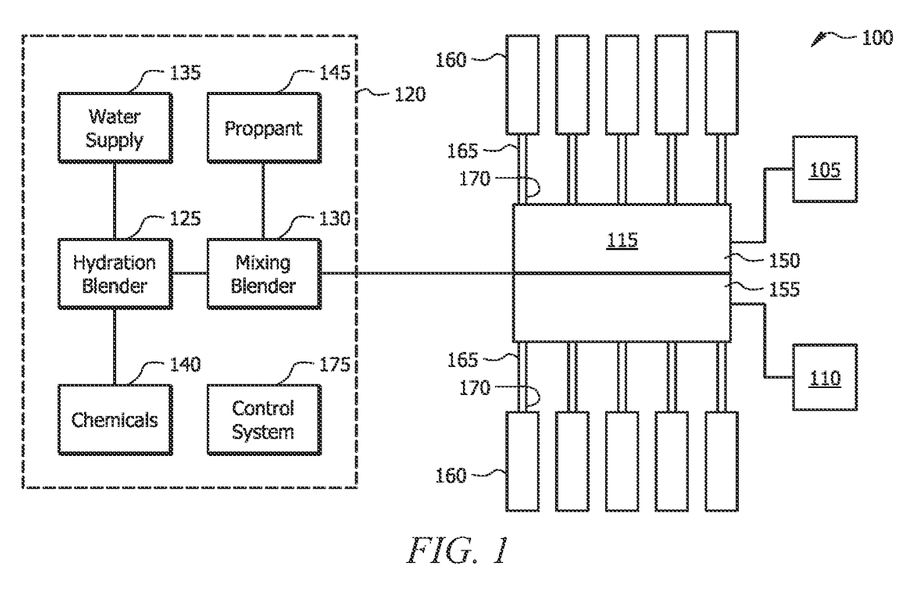
FIG. 1 is a schematic diagram of an example centralized well treatment facility, according to one or more aspects of the present disclosure.

FIG. 1 illustrates an example of a centralized well treatment system 100 that can employ the principles of the present disclosure. While the present disclosure may describe a centralized well treatment system 100, one of ordinary skill in the art would recognize that the disclosed systems and methods may be used in a variety of different industries and with other servicing equipment (for example, with construction or mining operations). Multiple wells, such as a first well 105 and a second well 110 may be treated or stimulated using the centralized well treatment system 100. The well treatment system 100 may be set upon a pad from which at least the first well 105 and the second well 110 may be serviced. In some embodiments, the well treatment system 100 may be connected to at least the first well 105 and the second well 110 via a central manifold 115. Connections within the well treatment system 100 may be a standard piping or tubing known to one of ordinary skill in the art. The well treatment system 100 may include a centralized location 120 that includes at least some of the components of the well treatment system 100 and may be open, or may be at least partially enclosed with various combinations of structures including a supported fabric structure, a collapsible structure, a prefabricated structure, a retractable structure, a composite structure, a temporary building, a prefabricated wall and roof unit, a deployable structure, a modular structure, a preformed structure, or a mobile accommodation unit.

Advantageously, the well treatment system 100 may allow for fluids for treatment, stimulation, fracturing, or other well operations to be manufactured, formed and/or mixed at the centralized location 120 prior to being transferred to the first well 105 and the second well 110. In some embodiments, well fluids can be created by optionally mixing constituents in a hydration blender 125 before mixing the fluid in a mixing blender 130. In some embodiments, water from a water supply 135 and dry powder may be introduced into the hydration blender 125. Dry powder, such as guar may be metered into the hydration blender 125 from a storage tank via a screw conveyor. In some embodiments, various chemical additives and modifiers may be introduced into the hydration blender 125 from a chemical storage system 140.

In some embodiments, the chemical storage system 140 is connected to the hydration blender 125 and may include tanks for breakers, gel additives, crosslinkers, and liquid gel concentrate. The tanks may have level control systems such as a wireless hydrostatic pressure system and may be insulated and heated. Pressurized tanks may be used to provide positive pressure displacement to move chemicals, and some tanks may be agitated and circulated. The chemical storage system 140 may continuously meter chemicals with additive pumps, which are able to meter chemical solutions to the hydration blender 125 at specified rates as determined by the required final concentrations and the pump rates of the main treatment fluid from the hydration blender 125. In some embodiments, chemical storage tanks of the chemical storage system 140 are pressurized to drive fluid flow. The quantities and rates of chemicals added to the main fluid stream may be controlled by valve-metering control systems. In addition, chemical additives may be added to the main treatment fluid in the hydration blender 125 via aspiration. The rates that the chemical additives are aspirated into the main fluid stream may be controlled via adjustable, calibrated apertures located between the chemical storage system 140 and the hydration blender 125. In some embodiments, the components of the chemical storage system 140 are modularized allowing pumps, tanks, or blenders to be added or removed independently.

After pre-mixing in the hydration blender 125, the treatment or fracturing fluid may be further mixed in the mixing blender 130. In some embodiments, mixing can occur solely in the mixing blender 130 without any pre-mixing in the hydration blender 125. In some embodiments, the mixing blender 130 may be utilized to introduce, mix and blend proppant and chemical additives into a base fluid. Mixing can be accomplished at downhole pump rates. In some embodiments, the mixing blender 130 is configured to blend proppant and chemical additives into the base fluid without destroying the base fluid properties while still providing ample energy for the blending of proppant into a near fully hydrated fracturing fluid.

Proppant may be introduced into the mixing blender 130 from a proppant storage system 145. In some embodiments, the proppant storage system 145 may include automatic valves and a set of tanks that contain proppant. Each tank can be monitored for level, material weight, and the rate at which proppant is being consumed. This information may be transmitted to a controller or control area. Each tank is capable of being filled pneumatically and may be emptied through a calibrated gravity discharge. Tanks may be added to or removed from the proppant storage system 145 as needed. Empty storage tanks may be replenished as full or partially full tanks are being used, allowing for continuous operation. The tanks may be arranged around a calibrated v-belt conveyor. In addition, a resin-coated proppant may be used by the addition of a mechanical proppant coating system.

In some embodiments, the mixed or manufactured fluid from the mixing blender 130 may be pumped simultaneously to the first well 105 and the second well 110 via the central manifold 115. In some embodiments, the central manifold 115 may be isolated into a first isolated manifold path 150 directed to the first well 105 and a second isolated manifold path 155 directed to the second well 110. The first isolated manifold path 150 and the second isolated manifold path 155 may be integrated in a single, central manifold 115. The use of the central manifold 115 may allow for multiple wells to be fractured or treated simultaneously.

Treatment or fracturing fluid may be transferred, transported, and/or pressurized within the first isolated manifold path 150 and the second isolated manifold path 155 via an array of pumps 160. The array of pumps 160 may be fluidly connected to the first isolated manifold path 150 via suction lines 165 and discharge lines 170. A separate array of pumps 160 may be fluidly connected to the second isolated manifold path 155 via suction lines 165 and discharge lines 170. The pumps 160 within the arrays may be electric, gas, diesel, or natural gas powered. In some embodiments, the pumps 160 may be modularized for ease of configuration. In some embodiments, the output and pressure of the pumps 160 may be adjusted in response to sensor data, such as data received from a flow meter.

In some embodiments, the operations of the chemical storage system 140, hydration blender 125, proppant storage system 145, mixing blender 130, manifold 115, and/or pumps 160 are controlled, coordinated, and monitored by the central control system 175. The central control system 175 may utilize sensor data as well as operating parameters from the chemical storage system 140, hydration blender 125, proppant storage system 145, mixing blender 130, manifold 115, and pumps 160 to identify operation of the well treatment system 100. In some embodiments, the control system 175 may be utilized to adjust the output of the pumps 160 by utilizing flow data in light of fluid flow or pressure targets for the first well 105 and/or the second well 110. In some embodiments, fluid flow to the first well 105 and/or the second well 110 may be exclusively controlled by adjusting the output of the pumps 160. Further, information from a flow meter can be utilized to control desired fluid properties such as density, rate, viscosity, etc. Flow information can also be utilized to identify dynamic or steady state bottlenecks within the well treatment system 100. The central control system 175 may also be used to monitor equipment health and status. In one or more embodiments, the central control system 175 may be disposed about any suitable location in the well treatment system 100. In alternate embodiments, central control system 175 may be located remotely from the well treatment system 100. The central control system 175 may be directly or indirectly coupled to any one or more components of the well treatment system 100.

In certain embodiments, the central control system 175 may comprise at least a processor and a memory device coupled to the processor that contains a set of instructions that when executed cause the processor to perform certain actions. In any embodiment, the central control system 175 may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The central control system 175 may include random access memory (RAM), one or more processing resources such as a central processing unit (CPU) or hardware or software control logic, read only memory (ROM), and/or other types of nonvolatile memory. Additional components of the central control system 175 may include one or more disk drives, one or more network ports for communication with external devices as well as various input and output (I/O) devices, such as a keyboard, a mouse, and a video display. The central control system 175 may also include one or more buses operable to transmit communications between the various hardware components.

In one or more embodiments, each of the pumps 160, the central manifold 115, any one of the operational devices of the centralized location 120, and any combinations thereof may be disposed onto vehicles, skids, trailers, and the like. In further embodiments, any other suitable equipment transportable to a location configured to operate from a power source may be disposed onto vehicles, skids, trailers, and the like. In other embodiments, the disclosed equipment may be removed from or remain in place on the vehicles, skids, trailers, and the like while operating at the designated location. Any one of the aforementioned components may be transported to a well site containing at least a singular well (for example, the first well 105 and/or the second well 110).

Figure 2:
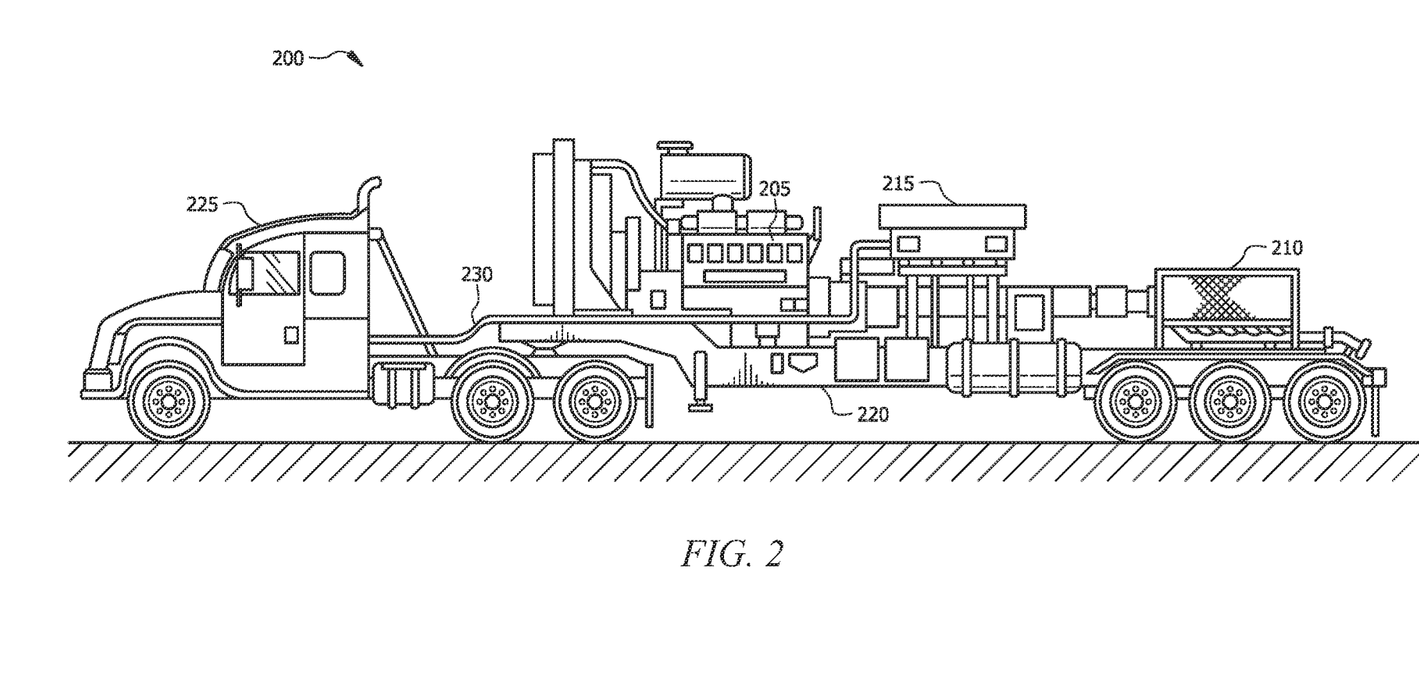
FIG. 2 is a diagram illustrating an example pumping system, according to aspects of the present disclosure.

FIG. 2 illustrates an example pumping system 200, according to aspects of the present disclosure. The pumping system 200 may be used, for instance, as one or more of the pumps 160 described above with reference to FIG. 1. As depicted, the pumping system 200 may comprise a first mover 205 in the form of a diesel engine coupled to a reciprocating pump 210 through a transmission system 215 into which a second mover (not shown) in the form of an electric motor (or electric motor/generator) may be integrated. The first mover 205, pump 210, and transmission system 215 may be mounted on a trailer 220 coupled to a truck 225. The truck 225 may comprise, for instance, a conventional engine that provides locomotion to the truck 225 and trailer 220 through a transmission incorporating an electric motor or hydraulic system. The pumping system 200 may further comprise an electrical connection 230, such as a cable, between the transmission of the truck 225 and the second mover in the pump transmission system 215.

In use, the truck 225 and trailer 220 with the pumping equipment mounted thereon may be driven to a well site at which a fracturing or other treatment operation will take place. In certain embodiments, the truck 225 and trailer 220 may be one of many similar trucks and trailers that are driven to the well site. Once at the site the pump 210 may be fluidically coupled to a wellbore (not shown), such as through a fluid manifold (for example, central manifold 115 in FIG. 1), to provide treatment fluid to the wellbore. The pump 210 may further be fluidically coupled to a source of treatment fluids to be pumped into the wellbore. When connected, the diesel engine may be started to provide a primary source of torque to the pump 210 through the pump transmission system 215. The second mover in the pump transmission system 215 similar may be engaged to provide a supplemental source of torque to the pump 210. In one or more embodiments, the second mover in the pump transmission system 215 may receive energy directly from the transmission of the truck 225, such that the truck itself operates as an electrical generator for the pumping operation. In addition to energy from the truck 225 and the second mover in the pump transmission system 215, the pump 210 may receive electricity from other energy sources on the site, including a dedicated electrical generator on site or other pumping systems located on the site.

Figure 3:
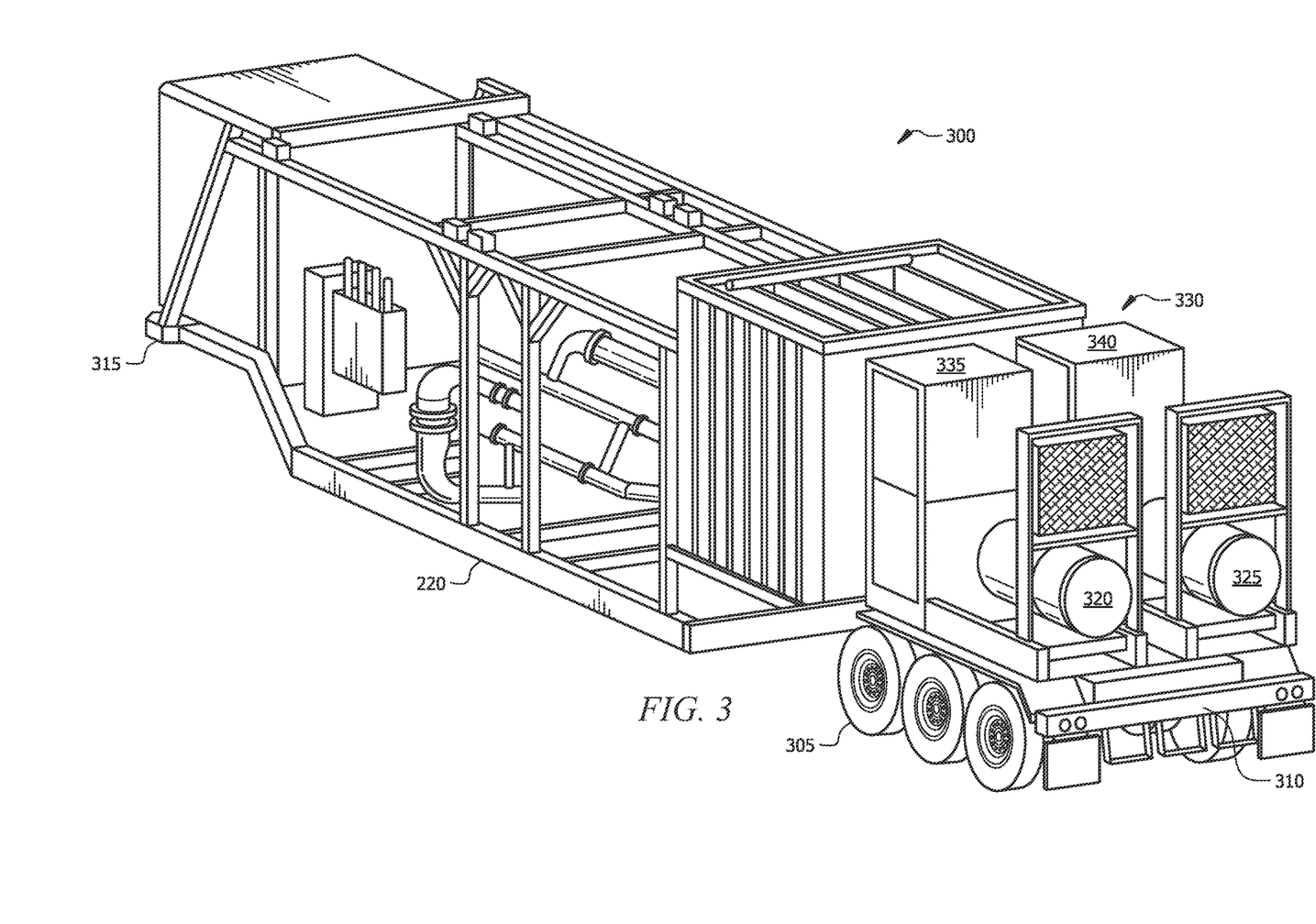
FIG. 3 is a diagram illustrating an example transportable system, according to aspects of the present disclosure.

FIG. 3 illustrates an example transportable system 300. As illustrated, the transportable system 300 may be disposed upon the trailer 220. In embodiments, the trailer 220 may be configured to transport and support the transportable system 300 and any other suitable equipment. The trailer 220 may comprise any suitable size, height, shape, and any combinations thereof. In embodiments, the trailer 220 may generally comprise a chassis with a rectangular cross-sectional shape. Further, the trailer 220 may comprise any suitable materials, such as metals, nonmetals, polymers, composites, and any combinations thereof. The chassis may comprise one or more sets of wheels 305 disposed at a first end 310 of the trailer 220 to provide for a means of conveying the trailer 220 from one location to another. In alternate embodiments, the one or more sets of wheels 305 may be disposed near a second end 315 opposite to the first end 310. In one or more embodiments, the second end 315 of the trailer 220 may be attached to a vehicle (not shown) to be transported. Once the vehicle has transported to a designated location, an operator may detach the trailer 220 and initiate operations of the transportable system 300. While the present disclosure may describe a transportable system 300 comprising one or more sets of wheels 305, one of ordinary skill in the art would recognize that any other transportable system 300 without wheels 305 may be utilized (for example, a skid-mounted system). In those embodiments, a skid-mounted system may be transportable via a forklift, crane, and the like to a separate trailer, rig, vessel, truck, etc.

As illustrated, the trailer 220 may comprise a first power module 320, a second power module 325, and a power distribution system 330. Each of the first power module 320 and the second power module 325 may be disposed about any suitable location on the trailer 220 or in relation to the rest of the transportable system 300. While the first power module 320 and the second power module 325 are illustrated as being disposed at the first end 310, they may be disposed about the center of the trailer 220, about the second end 315, at a distance from the trailer 220, and the like. In one or more embodiments, the transportable system 300 may not be limited to the first power module 320 and the second power module 325. One of ordinary skill in the art would recognize that the transportable system 300 may comprise one or more power modules.

Both the first power module 320 and the second power module 325 may be configured to provide energy and/or power to the transportable system 300, wherein the components of the transportable system 300 may operate based, at least in part, on the energy provided by the first power module 320 and/or the second power module 325. In embodiments, the first power module 320 and/or the second power module 325 may operate as the prime movers of the transportable system 300. Without limitations, the first power module 320 and the second power module 325 may be an AC or DC electric motor, a hydraulic motor, a pneumatic motor, an internal combustion engine powered by gasoline, natural gas, diesel, or a combination of the aforementioned fuels, a gas turbine, or a steam turbine. In some embodiments, both the first power module 320 and the second power module 325 may be the same type of energy source. In alternate embodiments the first power module 320 may be a different energy source from the second power module 325. In embodiments, the first power module 320 further comprises a support system, wherein the support system of the first power module 320 is selected from a group consisting of a cooling system, a fuel tank, and a control panel, wherein the support system is self-contained within the first power module 320.

Both the first power module 320 and the second power module 325 may be configured to provide energy in the form of rotational motion to the power distribution system 330. In one or more embodiments, the provided rotational motion may be designated to operate at a selected fixed speed (for example, 1800 RPM). For example, diesel engines may typically operate in the range of about 700-1800 RPM or 700-2100 RPM, while AC motors without speed control may typically run at 1200, 1800, or 3600 RPM Any suitable power module may include a gearbox or transmission configured to adjust the speed to the input requirement of the power distribution system 330.

The power distribution system 330 may comprise at least one power distribution unit. As illustrated in FIG. 3, the power distribution system 330 may comprise a first power distribution unit 335 and a second power distribution unit 340. In one or more embodiments, both the first power distribution unit 335 and the second power distribution unit 340 may be configured to provide power to one or more variable speed components disposed within the transportable system 300 (for example, pump 160) based on the rotational motion provided by the first power module 320 and/or the second power module 325. In embodiments, the first power distribution unit 335 may be coupled to the first power module 320, and the second power distribution unit 340 may be coupled to the second power module 325, respectively. There may be an equivalent number of power distribution units as there are power modules disposed within the transportable system 300. In embodiments, the operational speed output of the first power module 320 may be required to be compatible to the operational speed input to the first power distribution unit 335, wherein the same may be applied to the second power module 325 with respect to the second power distribution unit 340.

As the first power module 320 and/or the second power module 325 are actuated to operate to produce rotational motion, the power distribution system 330 may receive the produced rotational motion via a rotational power coupling (for example, rotational power coupling 400 in FIGS. 4A-4B) coupling the first power distribution unit 335 and/or the second power distribution unit 340 to the first power module 320 and/or the second power module 325, respectively. The power distribution system 330 may comprise a gearbox or pump drive that will take the single rotational input and have multiple rotational output locations to drive multiple rotational power converters. These may be hydraulic pumps but could be pneumatic air compressors, AC or DC electric generators, or a combination thereof. A plurality of power converters may be installed on each power distribution unit (for example, first power distribution unit 335 and/or the second power distribution unit 340). Each power converter may be of a different power output type.

Each power module or power distribution unit may include ancillary components such as hydraulic or air tanks, coolers, filters, air dryers, power disconnect switches, breakers, fuses. However, these may be installed on other locations of the equipment system instead of within the power module or power distribution unit (for example, a suitable location within the transportable system 300). The power distribution system 330 or power modules may include covers (not shown) for noise abatement, protection from the environment, to contain fluid leaks, and any combinations thereof.

The equipment of the transportable system 300 powered from the rotational power converters could be various types depending on what types of rotational power converters are installed. Typical components driven on the transportable system 300 may be rotary devices (for example, centrifugal pumps, mixers, agitators, chemical metering pumps, augers, or fans), rotary actuators (for opening valves or gates), or linear actuators (for positioning system components).

In one or more embodiments, the transportable system 300 may have a standard energy footprint that requires a certain amount of energy to operate. The power distribution system 330 may be configured to accept any suitable number and type of power module in order to satisfy the standard energy footprint of that transportable system 300. For example, the transportable system 300 may arrive at the well site with an initial configuration containing a first power module 320 and a second power module 325, wherein the first power module 320 may be an electric motor and the second power module 325 may be a diesel engine.

An operator may determine that the initial configuration would not satisfy the standard energy footprint. In these embodiments, one of the power modules may be replaced by another (such as replacing the first power module 320 with a diesel engine) for a secondary configuration in order to provide adequate energy and power to the transportable system 300. In these embodiments, the operator may make this determination via the control system 175 (referring to FIG. 1) and/or via a separate information handling system. The control system 175 and/or the separate information handling system may determine based, at least in part, on the initial configuration and the standard energy footprint that a secondary configuration needs to be arranged in order to operate the transportable system 300. In one or more embodiments, the decision to maintain the initial configuration or change to a secondary configuration may be determined based, at least in part, on one or more factors such as the horsepower required to operate the power distribution system 330, the availability of a specific fuel, the price of a specific fuel, the availability of electrical power, environmental factors such as noise and/or exhaust emissions, and any combinations thereof. In embodiments, each power module may be interchangeable with one another within the power distribution system 330 (for example, one power module may be replaced with another power module).

Figure 4A:
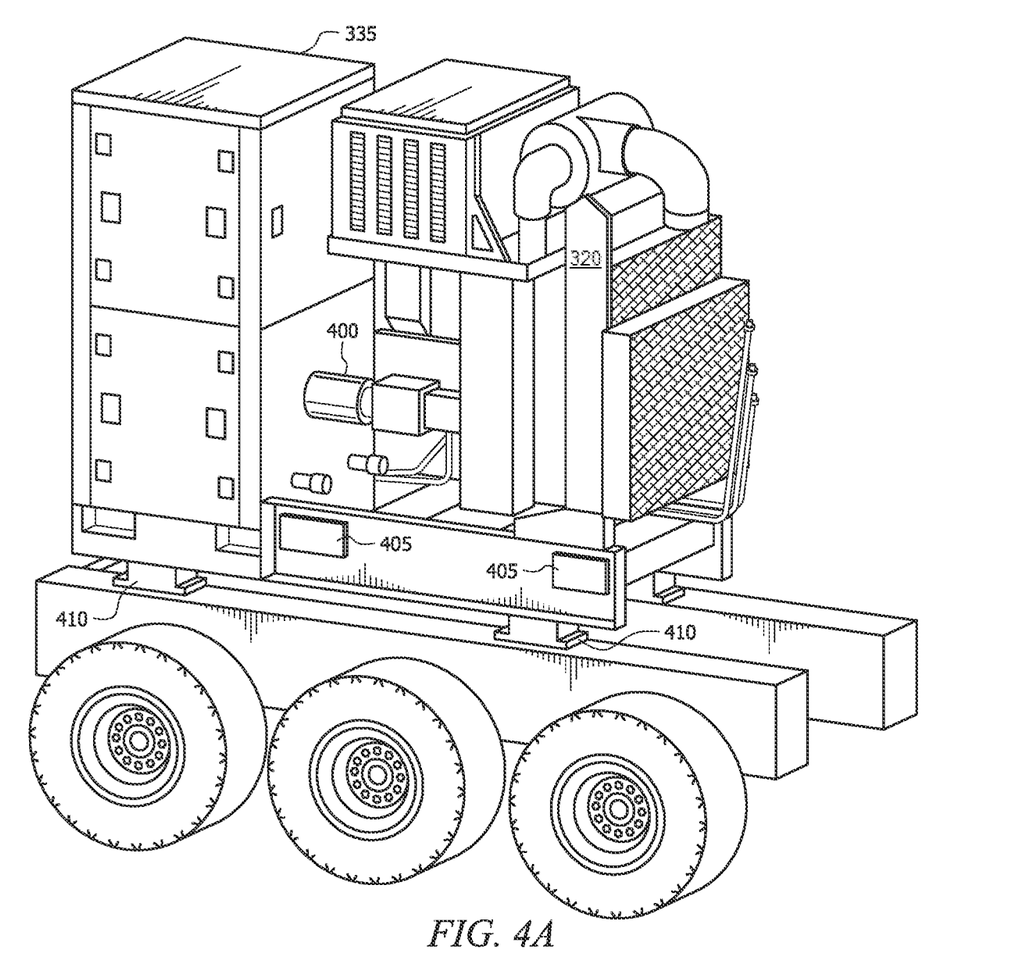
FIG. 4A is a diagram illustrating an example power distribution unit and an example power module, according to aspects of the present disclosure.
Figure 4B:
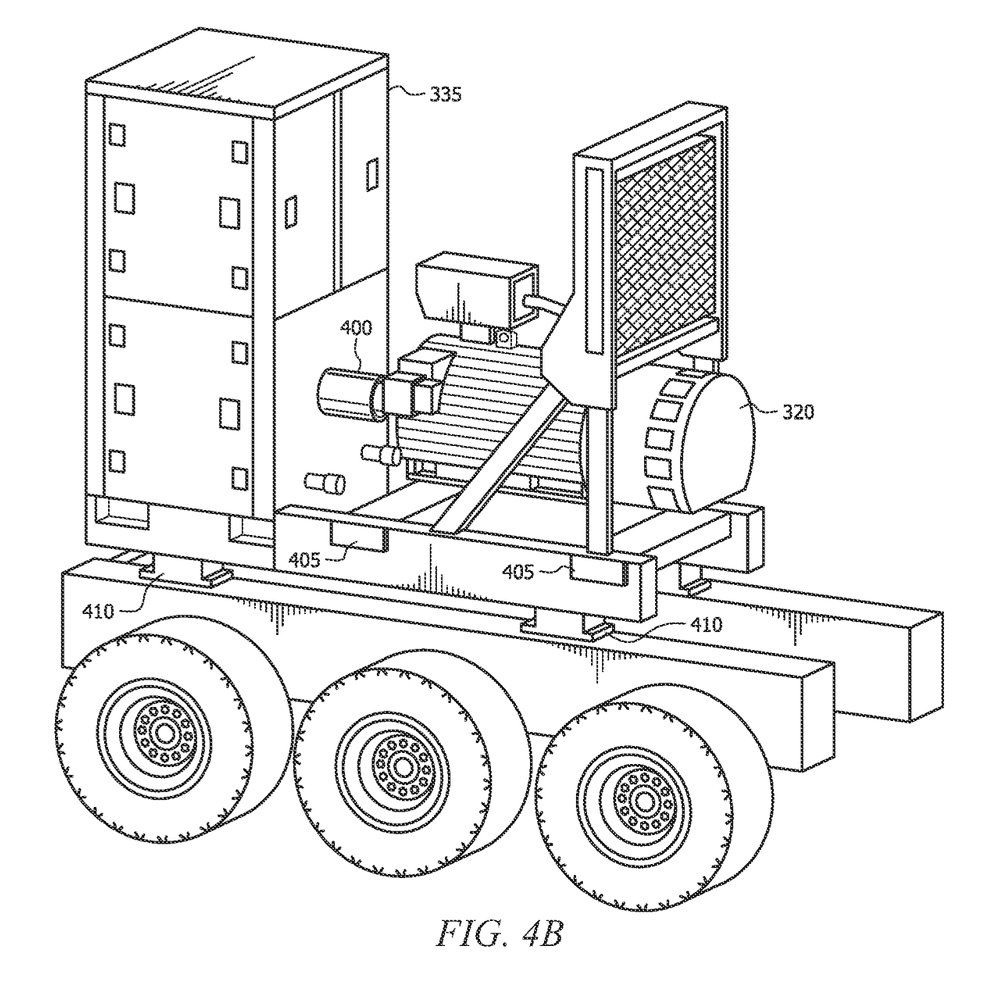
FIG. 4B is a diagram illustrating an example power distribution unit and an example power module, according to aspects of the present disclosure.

FIGS. 4A-4B illustrate an example power distribution unit and an example power module. FIG. 4A illustrates one embodiment of the first power distribution unit 335 and the first power module 320. FIG. 4B illustrates another embodiment of the first power distribution unit 335 and the first power module 320. One of ordinary skill in the art would to recognize that these embodiments of the first power distribution unit 335 and the first power module 320 may be applicable to the second power distribution unit 340 and the second power module 325. As illustrated in both FIGS. 4A-4B, the first power distribution unit 335 may couple to the first power module 320 via a rotational power coupling 400. While the first power module 320 may be a diesel engine, as shown in FIG. 4A, or an electric motor, as shown in FIG. 4B, the rotational power coupling 400 may couple the first power distribution unit 335 to the first power module 320. In one or more embodiments, the rotational power coupling 400 may be any suitable coupling, such as a drive shaft.

In one or more embodiments, each of the power modules may be designed so as to be interchangeable and to have a common mounting arrangement for ease of removal and installation. The power module 320 or 325 may have attachment points to make it easy for installation, such as forklift pockets 405, for connection for lifting by a forklift, crane, and the like. In one or more embodiments, a forklift (not shown) may be inserted into the forklift pockets and actuated to raise and lower the first power module 320 and/or second power module 325. There may further be one or more vibration dampers 410 disposed between the first power module 320 and/or second power module 325 and the transportable system 300. In embodiments, the first power module 320 and/or second power module 325 may be coupled to the transportable system 300 via one or more mounting bolts (not shown). The one or more vibration dampers 410 may be configured to reduce transmission of the vibrations produced by the first power module 320 and/or second power module 325 to the transportable system 300.

Each of the first power module 320 and second power module 325 may be started, stopped, or controlled locally from the respective power module, remotely from somewhere else on the transportable system 300 or remotely from another point at the wellsite or remote from the wellsite. Each of the first power module 320 and second power module 325 may be equipped with emergency stop features that can be activated locally at several points on the equipment or remotely. Each of the first power module 320 and second power module 325 may be equipped with support systems (not shown) (for example, a cooling system, a fuel tank, and/or a control panel to start, stop, and/or monitor a condition of the power module). In one or more embodiments, including these support systems may minimize the connections to the rest of the equipment of transportable system 300 and may reduce the time swapping between interchangeable power modules. In some embodiments, when installing a power module (for example, first power module 320 and/or second power module 325), the mounting bolts between the respective power module and the transportable system 300 may be the only connections required to couple the power module to the transportable system 300. Further, each power module may then connect to a respective power distribution unit by coupling the rotational power coupling 400 of the power module to the power distribution unit.

Figure 5A:
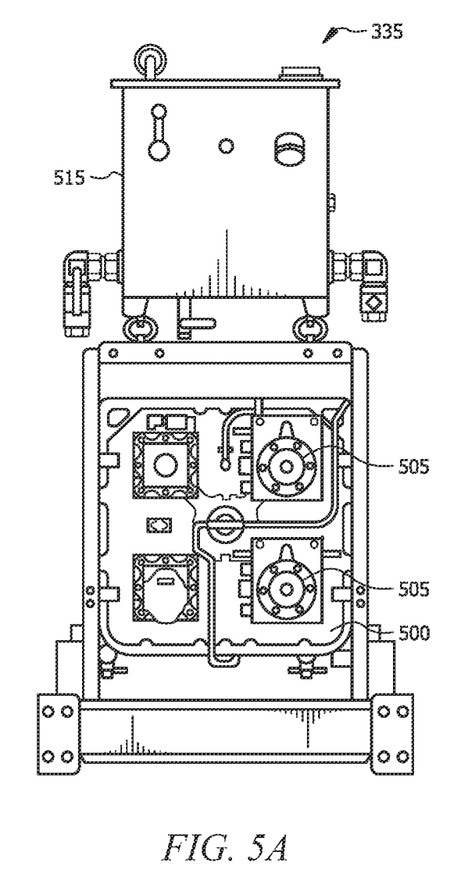
FIG. 5A is a diagram illustrating an example power distribution unit, according to aspects of the present disclosure.
Figure 5B:
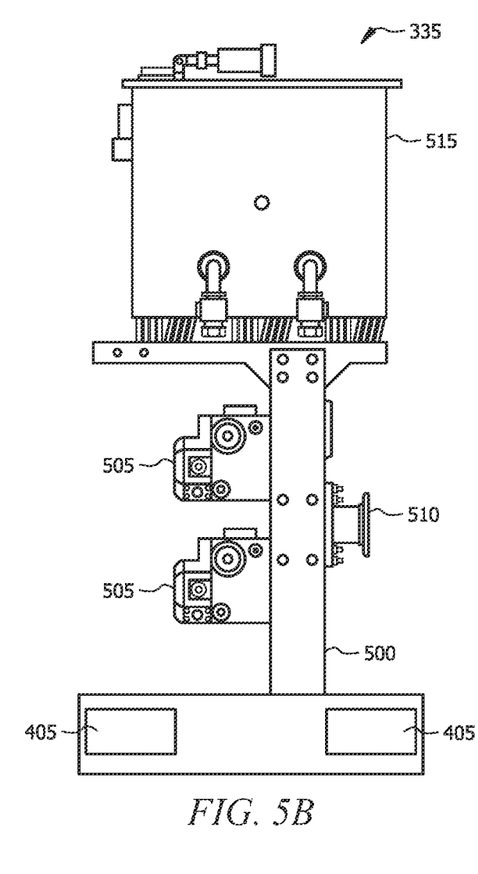
FIG. 5B is a diagram illustrating an example power distribution unit, according to aspects of the present disclosure.

FIGS. 5A-5B illustrate an example power distribution unit. FIG. 5A illustrates one view of an embodiment of the interior components of the first power distribution unit 335. FIG. 5B illustrates another view of the same embodiment of the interior components of the first power distribution unit 335. One of ordinary skill in the art would recognize that these embodiments of the first power distribution unit 335 may be applicable to the second power distribution unit 340. As illustrated, the first power distribution unit 335 may comprise a gearbox 500, one or more power converters 505, an input connection 510, and an ancillary component 515. In embodiments, any suitable speed reducer or increaser may be used as the gearbox 500. The gearbox 500 may be configured to receive the torque output from the first power module 320 (referring to FIG. 3) via the rotational power coupling 400 (referring to FIG. 4) and output an operational speed to other equipment within the transportable system 300 (referring to FIG. 3) that is higher or lower than the received speed related to the output torque from the rotational power coupling 400.

In embodiments, the gearbox 500 may drive the one or more power converters 505. Without limitations, the one or more power converters 505 may include hydraulic pumps, pneumatic air compressors, AC or DC electric generators, or a combination thereof. In one or more embodiments, each of the one or more power converters 505 may be of a different power output type. The one or more power converters 505 may be configured to indirectly couple the gearbox 500 to the other equipment within the transportable system 300. As illustrated in FIG. 5B, the input connection 510 may be coupled to the gearbox 500. Any suitable connection may be used as the input connection 510. In one or more embodiments, the input connection 510 may directly couple to the rotational power coupling 400 and transfer the output torque from the rotational power coupling 400 to the gearbox 500. Further, the ancillary component 515 may be disposed about a top portion of the first power distribution unit 335. Without limitations, the ancillary component 515 may be hydraulic or air tanks, coolers, filters, air dryers, power disconnect switches, breakers, fuses, and the like.

With reference to FIGS. 1-5B, a method of operating the transportable system 300 may be described. In one or more embodiments, an operator may reduce the power of first power module 320 and/or second power module 325 to effectively be off. In embodiments, the operator may then disconnect the respective rotational power coupling 400 from the first power module 320 or second power module 325. Further, the operator may disconnect any other connections from the first power module 320 and/or second power module 325 to other equipment present in the transportable system 300. In one or more embodiments, the operator may then disconnect the one or more mounting bolts used to couple the first power module 320 and/or second power module 325 to the transportable system 300. The first power module 320 and/or second power module 325 may then be removed from the transportable system via a forklift, crane, and the like, and a replacement power module may be installed.

An embodiment of the present disclosure is a transportable system, comprising: a power distribution system comprising a first power distribution unit; and a first power module; wherein the first power module is configured to provide energy in the form of rotational motion to the power distribution system, wherein the first power distribution unit comprises one or more power converters and an input connection, wherein the first power distribution unit is coupled to the first power module, wherein the rotational energy from the first power module is transferred to the one or more power converters via the input connection. In one or more embodiments described in the preceding paragraph, wherein the power distribution system further comprises a second power distribution unit, wherein the transportable system further comprises a second power module, wherein the second power module is configured to provide energy in the form of rotational motion to the power distribution system, and wherein the second power distribution unit is coupled to the second power module. In one or more embodiments described above, wherein the second power distribution unit is coupled to the second power module via a rotational power coupling, wherein the second power module is configured to operate at a fixed speed, wherein the second power distribution unit is configured to operate components of the transportable system at variable speeds. In one or more embodiments described above, wherein the second power module is selected from a group consisting of an AC electric motor, a DC electric motor, a hydraulic motor, a pneumatic motor, an internal combustion engine powered by gasoline, natural gas, diesel, or a combination of the aforementioned fuels, a gas turbine, and a steam turbine. In one or more embodiments described above, wherein the second power module is configured to be interchangeable with another separate power module. In one or more embodiments described above, wherein the first power module is configured to operate by a primary energy source, wherein the second power module is configured to operate by a secondary energy source. In one or more embodiments described above, wherein the first power distribution unit is coupled to the first power module via a rotational power coupling, wherein the first power module is configured to operate at a fixed speed, wherein the first power distribution system is configured to operate components of the transportable system at variable speeds. In one or more embodiments described above. In one or more embodiments described above, wherein the first power module is selected from a group consisting of an AC electric motor, a DC electric motor, a hydraulic motor, a pneumatic motor, an internal combustion engine powered by gasoline, natural gas, diesel, or a combination of the aforementioned fuels, a gas turbine, and a steam turbine. In one or more embodiments described above, wherein the first power module is configured to be interchangeable with another separate power module. In one or more embodiments described above, wherein the one or more power converters are selected from a group consisting of a hydraulic pump, air compressor, AC electric generator, DC electric generator, or any combination thereof. In one or more embodiments described above, wherein the power distribution system is configured to operate components selected from a group consisting of a pump, mixer, agitator, auger, fan, rotary actuator, or linear actuators, or any combination thereof.

Another embodiment of the present disclosure is a method of configuring a transportable system, comprising: determining an initial configuration of a first power module coupled to a power distribution system, wherein the power distribution system comprises a first power distribution unit, based at least in part, on one or more factors; installing the first power module onto the transportable system; installing the first power distribution unit onto the transportable system; coupling the first power module to the first power distribution unit; and determining whether an interchangeable power module is to replace the first power module in a second configuration based at least in part, on the one or more factors.

In one or more embodiments described in the preceding paragraph, in response to determining that the interchangeable power module is to replace the first power module in the second configuration, further comprising: reducing power to the first power module; and decoupling the first power module from an input connection of the first power distribution unit. In one or more embodiments described above, further comprising: decoupling the first power module from the transportable system; and installing the interchangeable power module to replace the first power module. In one or more embodiments described above, wherein the first power module is configured to operate by a primary energy source or a secondary energy source, wherein the interchangeable power module is configured to operate by a different energy source from the first power module. In one or more embodiments described above, wherein the first power module is selected from a group consisting of an AC electric motor, a DC electric motor, a hydraulic motor, a pneumatic motor, an internal combustion engine powered by gasoline, natural gas, diesel, or a combination of the aforementioned fuels, a gas turbine, and a steam turbine. In one or more embodiments described above, further comprising: determining an initial configuration of a second power module coupled to a power distribution system, wherein the power distribution system comprises a second power distribution unit, based at least in part, on one or more factors; and determining whether the interchangeable power module is to replace the second power module in the second configuration based at least in part, on one or more factors. In one or more embodiments described above, further comprising: decoupling the second power module from the transportable system; and installing the interchangeable power module to replace the second power module. In one or more embodiments described above, wherein the second power module is configured to operate by a primary energy source or a secondary energy source, wherein the interchangeable power module is configured to operate by a different energy source from the second power module.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein.

While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A transportable well service equipment system mounted on a single trailer or on a single skid, comprising:
   a first power module, wherein the first power module comprises a prime mover that is a prime mover type selected from the group consisting of an electric motor, a hydraulic motor, a pneumatic motor, an internal combustion engine, a gas turbine, and a steam turbine;
   a first power distribution unit coupled via a rotational coupling to receive rotational power from the first power module; and
   at least one item of well service equipment coupled to receive power from the first power distribution unit, wherein the at least one item of well service equipment is selected from the group consisting of a centrifugal pump, a mixer, an agitator, a chemical metering pump, an auger, a fan, a rotary value actuator, a rotary gate actuator, and a linear actuator,
   wherein the first power module is configured to be interchangeable with a second power module, wherein the second power module comprises a prime mover that is a prime mover type selected from the group consisting of the electric motor, the hydraulic motor, the pneumatic motor, the internal combustion engine, the gas turbine, and the steam turbine, wherein the prime mover type of the second power module is different from the prime mover type of the first power module.

2. The transportable well service equipment system of claim 1, further comprising a third power module and a second power distribution unit coupled via a second rotational power coupling to receive rotational power from the third power module.

3. The transportable well service equipment system of claim 2, wherein the third power module is configured to operate at a fixed speed, wherein the second power distribution unit is configured to operate components of the transportable well service equipment system at variable speeds.

4. The transportable well service equipment system of claim 2, wherein the third power module is selected from a group consisting of an AC electric motor, a DC electric motor, a hydraulic motor, a pneumatic motor, an internal combustion engine, a gas turbine, and a steam turbine.

5. The transportable well service equipment system of claim 2, wherein the third power module is configured to be interchangeable with another separate power module.

6. The transportable well service equipment system of claim 2, wherein the second power distribution unit is configured to operate an item of well service equipment selected from the group consisting of a centrifugal pump, a mixer, an agitator, a chemical metering pump, an auger, a fan, a rotary value actuator, a rotary gate actuator, and a linear actuator.

7. The transportable well service equipment system of claim 1, wherein the first power module is configured to operate at a fixed speed, wherein the first power distribution unit is configured to operate the at least one item of well service equipment coupled to receive power from the first power distribution unit at variable speeds.

8. The transportable well service equipment system of claim 1, wherein the first power module and the second power module have a common mounting arrangement configured for ease of removal and installation.

9. The transportable well service equipment system of claim 8, wherein the common mounting arrangement of the first power module and the second power module reduces time interchanging between the first power module and the second power module.

10. The transportable well service equipment system of claim 1, wherein the first power module and the second power module have forklift pockets.

11. The transportable well service equipment system of claim 1, wherein the first power module comprises a support system comprising a cooling system or a fuel tank.

12. The transportable well service equipment system of claim 1, wherein the transportable well service equipment system comprises at least two items of well service equipment coupled to receive power from the first power distribution unit, wherein the at least two items of well service equipment are selected from the group consisting of a centrifugal pump, a mixer, an agitator, a chemical metering pump, an auger, a fan, a rotary value actuator, a rotary gate actuator, and a linear actuator.

13. A method of operating a transportable well service equipment system mounted on a single trailer or on a single skid,
   comprising:
      reducing power of a first power module of the transportable well service equipment system to be off by an operator, wherein the transportable well service equipment system comprises the first power module, a power distribution unit coupled via a rotational power coupling to receive rotational power from the first power module, and an item of well service equipment coupled to receive power from the power distribution unit;

disconnecting the first power module by the operator from the power distribution unit;

removing the first power module from the transportable well service equipment system; and installing a second power module into the transportable well service equipment system to replace the first power module, wherein the second power module is a different prime mover type from the first power module.

14. The method of claim 13, further comprising:

disconnecting mounting hardware that couples the first power module to the transportable well service equipment system.

15. The method of claim 13, wherein the item of well service equipment is a pump and further comprising coupling the pump to a wellbore through a manifold.

16. The method of claim 13, wherein operating the transportable well service equipment system comprises fracturing a wellbore.

17. The method of claim 13, wherein the prime mover types are selected from the group consisting of an AC electric motor, a DC electric motor, a hydraulic motor, a pneumatic motor, a gas turbine, a steam turbine, and an internal combustion engine.

18. The method of claim 13, further comprising determining to replace the first power module with the second power module based on one more factors selected from the group consisting of horsepower needed to operate the transportable well service equipment system, availability of fuels, price of fuels, availability of electrical power, noise emissions, and exhaust emissions.

19. The method of claim 18, wherein determining to replace the first power module with the second power module is based on using a control system that monitors operating parameters of the transportable well service equipment system and parameters of a well treatment system and controls operations of the transportable well service equipment system and the well treatment system.

20. The method of claim 13, wherein removing the first power module from the transportable well service equipment system comprises inserting forks of the forklift into corresponding forklift pockets of the first power module.

21. The method of claim 13, wherein removing the first power module from the transportable well service equipment system comprises lifting the first power module using a crane.

22. The method of claim 13, wherein a vibration damper is disposed between the first power module and the transportable well service equipment system.

23. The method of claim 13, wherein the first power module comprises a support system comprising a cooling system or a fuel tank and wherein the first power module is removed from the transportable well service equipment system using a forklift or a crane.

* * * * *